May 25, 1937. W. H. CARMODY 2,081,448
HEAVY OIL
Filed Feb. 17, 1936
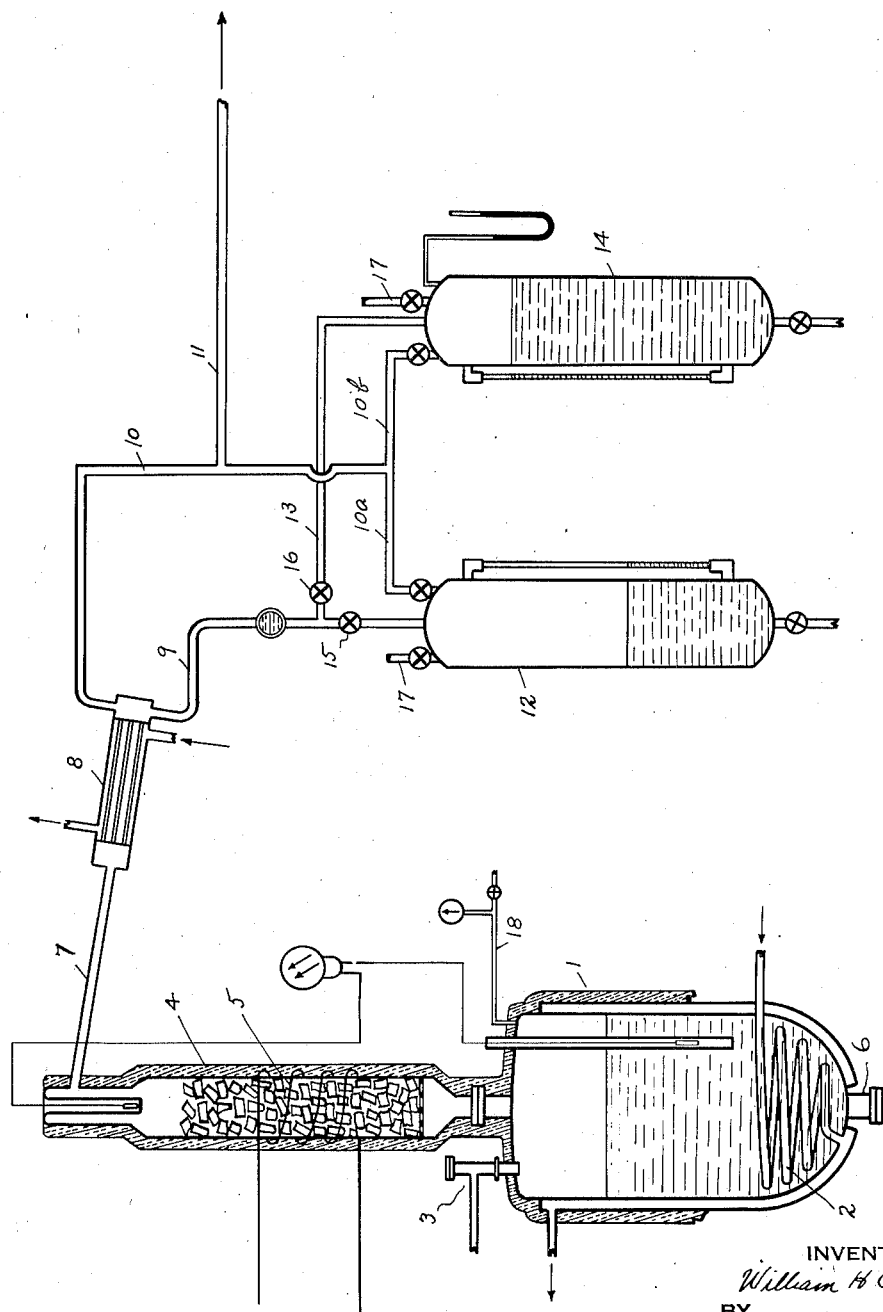
INVENTOR
William H. Carmody
BY
Christy and Wharton
ATTORNEYS Patented May 25, 1937

2,081,448

UNITED STATES PATENT OFFICE 2,081,448

HEAVY OIL

William H. Carmody, Pittsburgh, Pa., assignor to The Neville Company, a corporation of Pennsylvania Application February 17, 1936, Serial No. 64,333

2 Claims. (Cl. 260—7)

This invention relates to the purification of an oil-like material, which is resultant from a polymerization conducted in crude solvent naphtha, or an equivalent liquid containing polymerizable reactives. Such oil-like material is a heavy liquid, consisting preponderantly of dimers of coumarone, indene, dicyclopentadiene, and the like. It is known as "heavy oil."

This heavy oil is commonly produced as an incident to a polymerization process conducted in crude solvent naphtha from which hard coumarone-indene resin, commonly termed simply coumarone resin, is obtained. In accordance with the nature of the polymerization process, a greater or lesser proportion of the polymerizable reactives remain in the first stage of polymerization as the dimers comprising the heavy oil. As it comes from the steam still in which it is separated from the hard resin composed of higher polymers, the heavy oil contains naphthalene and substances of the solvent grade. It also contains aldehydes. The naphthalene and material of the solvent grade associated with the heavy oil render it generally unusable, and the aldehydes and sulphonates themselves give the heavy oil, as initially separated, a disagreeable odor and dark color renderng it unusable for many purposes. Also, the aldehydes lead to a progressive darkening of the heavy oil, apparently by lending themselves to the development of fulvene therein.

In reference to the presence of aldehydes in the heavy oil, it should be explained that the heavy oil, being composed preponderantly of dimers of unsaturates, i. e. coumarone and indene or dicyclopentadiene, possesses itself relatively high unsaturation. It is thus highly susceptible to the formation of aldehydes by oxidation, and as an apparent sequence is susceptible to deep discoloration by the development of fulvenes from the aldehydes so formed.

By treating the heavy oil under appropriate conditions, I am able so to purify it that I obtain a material boiling within the relatively narrow range of 300° C. to 360° C., which is substantially odorless, and which is water-white.

In conducting my process, I dehydrate heavy oil as by settling, heat, or agitation with calcium chloride, and commingle with it an alkaline metal, or alkaline metal compound, capable of acting as a catalyst to promote polymerization of the aldehyde content of the heavy oil. As such catalyst, I prefer to use sodium or sodium hydroxide, or, alternatively, potassium or potassium hydroxide. Calcium hydroxide or calcium oxide may be used, but are not to be considered so efficient in promoting aldehyde polymerization as any one of the preferred catalysts above named. Lithium hydroxide may be used, but is not desirable commercially because of its relatively high cost. In using either sodium or sodium hydroxide, I have found that a quantity of either of these catalysts, equal to one per cent. of the weight of the heavy oil, is adequate to promote aldehyde polymerization in the heavy oil. A similar weight of potassium or potassium hydroxide is adequate if either of these be utilized as the aldehyde polymerization catalyst, but five per cent. or more by weight of calcium hydroxide, or oxide, should be added in the event that either of these substances is used as the aldehyde catalyst.

After commingling the alkali with the heavy oil, which commingling may be performed with agitation at atmospheric temperatures, I distill the suspension of alkali and heavy oil under a relatively high vacuum. I have found the use of vacuum necessary in obtaining substantially complete purification of the heavy oil for reasons which will be hereinafter explained.

Considering the character of the heavy oil after the alkaline aldehyde-polymerization catalyst has been added to it, it is found that the heavy oil quickly darkens, due to the polymerization of the aldehydes, and probably further due to a reaction of the aldehydes to produce fulvenes. By polymerization of the aldehydes they are caused to form bodies of such weight that they are not readily carried over from a still during distillation of the crude heavy oil. The aldehyde polymers do, however, decompose readily at temperatures substantially exceeding 200° C. I employ a relatively high vacuum, of the order of 10 mm., or less, of mercury, which permits the heavy oil to be distilled away from the aldehyde polymers at a temperature below the decomposition temperature of those polymers. If a vacuum of 10 mm. is obtained, I have found a temperature of 175° C. to 200° C. adequate; by obtaining a vacuum of 5 mm., I have been able to distill the heavy oil at a temperature of from 157° C. to 185° C.; and with a vacuum of 2 mm., I have been able to distill the heavy oil at a temperature of from 141° C. to 170° C. The overlapping of temperature ranges may be considered to be due largely to variations in the ratio of coumarone dimers and indene dimers in the heavy oil itself.

In the accompanying drawing I show exemplary equipment for conducting my process.

Referring to the drawing, reference numeral 1 represents a jacketed still containing a tubular coil, or coils, 2 for circulating a heating liquid through the still. As shown, the still has thereon a connection 3 through which the alkali-treated heavy oil is introduced, and at the outlet end thereof leads into a reflux tower 4, which is shown as heated by coils 5 of resistance wire, but which may be heated by a tubular coil containing a heat-transferring fluid, or by a jacket conducting hot flue or stack gases. The still has a discharge connection 6 for drainage of residue in its bottom. A vapor line 7 leads from the upper end of fractionating tower 4 to a condenser 8, having connected therewith a line 9 for condensate.

Suitable means, such as ejectors (not shown), communicate by way of a connection 11 with a line 10 which is in communication with the vapor line at the condenser. Line 9 for condensate leads to a receiving vessel 12, and has therefrom a branch 13 leading to a receiving vessel 14. Valves 15 and 16 permit condensate to be directed to either of the vessels 12 and 14, and draw-off line 9 is provided with a sight glass so that the character of the condensate may be observed, and the condensate appropriately directed to one or the other of the receiving vessels. Vacuum line 10 is forked to provide valved branches 10a and 10b communicating respectively with the receiving vessels 12 and 14. Each of the vessels 12 and 14 is provided with a valved vacuum vent 17, by means of which the degree of vacuum within that vessel is maintained under control, and the still 1 has a vacuum vent 18 therein.

Describing my process in detail, I maintain distillation temperatures in the still 1 by passing heating fluid through the coil or coils 2. Desirably, I use for heating the still a liquid which has a boiling point higher than 200° C., as the use of such liquid heat-transferring agent avoids fire risks during distillation. After introduction of the liquid containing the heavy oil into the still, the temperature is raised gradually, first to distill off solvents and naphthalene. These forerunnings, which I have found normally to amount to 35% of the body of liquid subjected to distillation, are run as condensate into receiving vessel 12. When the distillation temperature is raised to about 175° C., heavy oil begins to come over, and is directed to receiving vessel 14. Distillation is continued under conditions of vacuum, desirably a vacuum of the order of 10 mm., or one exerting an even lower pressure, until substantially all of the heavy oil has been distilled off. Normally, the volume of heavy oil thus recovered is equal to about 50% of the initial liquid in the still.

Upon distillation of the heavy oil, there remains in the still a residue consisting chiefly of sulphonates and products of aldehyde polymerization and development, together with some resin in the higher stages of polymerization which has been initially carried from the steam still with the heavy oil, and fulvenes of resinous nature.

The reduction of pressure within the system produces an effect corollary to that of retaining aldehyde polymers within the still. Air within the system being minimized to the point of substantial exclusion as a preliminary to distillation, and this substantial exclusion of oxygen being maintained throughout distillation by continued air exhaustion, oxygen in substantial quantity cannot come into contact with the heavy oil in its vaporized, highly reactive condition. As the reaction of oxygen with the dimers of the heavy oil results in the formation of aldehydes, which as formed in the system would carry over with the heavy oil vapor, the exclusion of oxygen as such is of great moment in successfully conducting my process to produce a heavy oil which is not only purified in the common sense of the term, but which is also substantially free of aldehydes which tend to produce progressive darkening in the heavy oil.

To the end that oxygen may be excluded from the system, it is of importance that the entire system used in distillation be tightly sealed, and that it be made, so far as is possible, leak proof. As explained above, leakage of air into the system would, aside from the question of low temperature distillation, tend largely to nullify the benefit of my treatment by causing the formation of aldehydes, partially replacing the aldehydes removed by polymerization.

If the apparatus employed be such that there is adequate assurance against leakage, direct fire heating, rather than heating by a circulating heat-transferring fluid, may safely be utilized.

The heavy oil recovered as condensate in vessel 14 is approximately water-white and almost odorless, and may be considered as substantially free from aldehydes. In its clear and sweetened condition the heavy oil has high utility as a plasticizing oil, and for various other commercial purposes, for which the characteristics of the crude heavy oil render it unsuitable.

Because of the polymerization and definite removal of aldehydes, the heavy oil thus purified darkens but very slowly in contact with oxygen and under the influence of light. I have found also that there is a definite limit to which the darkening of this purified heavy oil is susceptible, and that even after long continued exposure to sunlight its color changes merely from a water-white to a clear light amber or light yellow. This effect is probably attributable to the definite removal of aldehydes from the heavy oil, and to the fact that its highly purified condition renders it relatively unsusceptible to subsequent formation of aldehydes in it. It is, therefore, a matter of primary importance that the conditions of the process be such that all or substantially all the aldehyde content of the crude heavy oil is retained in the residue as in the form of polymers, temperature conditions being maintained, by means of the vacuum effect, below the point at which the aldehydes tend to decompose and thereby to be carried over with the vaporized heavy oil. It is also a matter of primary importance that atmospheric oxygen should not be permitted to leak into the system to react therein to replace aldehydes in the heavy oil.

I claim as my invention:

1. The herein described method of purifying a heavy oily substance produced in resin manufacture comprising preponderantly the lower polymers of the polymerizables contained in crude solvent naphtha and equivalent liquids and recovered by separation from the higher resin forming polymers with which it is in production associated which comprises polymerizing aldehydes present in association with the heavy oil in unpurified condition by means of an alkaline material catalytically active in promoting aldehyde polymerization, and distilling the heavy oil away from residual aldehyde polymers and products and from the alkaline treating material under vacuum conditions represented by no more than 10 mm. of mercury under a temperature not substantially exceeding 200° C. while rigidly excluding oxygen from the liquid subjected to distillation and from the distillate.

2. The herein described refined heavy solvent plasticizing oil (derived from crude solvent naphtha) boiling within the range of 300° C. to 360° C. and consisting substantially wholly of the lower polymers of indene, coumarone, dicyclopentadiene and the like polymerizables of crude solvent naphtha; the said heavy oil being thus substantially free of aldehydes, fulvenes and the like bodies other than the lower polymers above identified which are naturally present in association with the said lower polymers, and being approximately colorless and odorless.

WILLIAM H. CARMODY.